INVENTOR.
Serge A. Scherbatskoy
BY Richard D. Mason
Attorney

Sept. 15, 1953 S. A. SCHERBATSKOY 2,652,310

SYSTEM AND APPARATUS FOR DETERMINING THE LISTENING HABITS OF WAVE SIGNAL RECEIVER USERS

Filed Oct. 24, 1947 4 Sheets-Sheet 2

Inventor
Serge A. Scherbatskoy

By Richard D Mason

Attorney

INVENTOR.
Serge A. Scherbatskoy
BY Richard D. Mason
Attorney

Inventor
Serge A. Scherbatskoy
By Richard D. Mason
Attorney

Patented Sept. 15, 1953

2,652,310

UNITED STATES PATENT OFFICE 2,652,310

SYSTEM AND APPARATUS FOR DETERMINING THE LISTENING HABITS OF WAVE SIGNAL RECEIVER USERS

Serge A. Scherbatskoy, Tulsa, Okla., assignor to A. C. Nielsen Company, Chicago, Ill., a corporation of Illinois Application October 24, 1947, Serial No. 781,986

8 Claims. (Cl. 346—37)

The present invention relates to systems and apparatus for determining the listening habits of users of wave signal receivers of the broadcast type, and more particularly to improvements in systems and apparatus for determining the audience popularity or rating of different programs transmitted from one or more wave signal transmitters and for gathering other information of great importance in determining the effectiveness of radio advertising.

Instrumented methods of determining the listening habits of home radio receiver users generally involve the use of a recording device operating in conjunction with each collaborator receiver used in the sampling system, to record the extent of use of the receiver and to record as a function of time, the wave signal transmitters to which the receiver is tuned for program reception. The usual device of this character embodies facilities for driving a recording element such as a tape for example at a constant speed and translating means for variably positioning a recording stylus or other recording means relative to a recording element in accordance with changes in the tuning of the wave signal receiver. The positions of the record indications along the recording element provide the necessary recording information from which it is possible to determine the particular stations to which the receiver was tuned and also the length of time to which the various stations were tuned in by the receiver. Thus, with a given starting time of the recording element accurately marked thereon each following point along the recording element is representative of a later chronological instant so long as the recording element is driven at a constant speed.

In general, two different types of recording device have been used to produce a record of the extent of receiver use and the particular transmitters to which the receiver is tuned for program reception during a predetermined calendar period. The first, or all mechanical type of device, employs a mechanical connection between the tuning shaft of the resonant frequency varying means such as the ganged condensers of a receiver and the recording stylus of the recorder to move the stylus transversely of a record tape, which is driven at constant speed, in accordance with the angular setting imparted to the condenser tuning shaft. While this type of device is entirely satisfactory in operation, it is not adapted for use in conjunction with all makes and types of broadcast receivers. Thus, the connection between the recorder stylus and the receiver tuning shaft dictates the positioning of the recorder in the receiver cabinet, which bars its use in conjunction with small receivers having limited unoccupied cabinet space. The second type of recording device is electro-mechanical in that an electro-mechanical translating system is interposed between the high frequency signal channel of the receiver and the station recording stylus to control the movement of the stylus in its operation to record on a time basis the particular transmitter from which programs are received. Prior art instruments of the second type are principally of the wavemeter construction wherein the local oscillator of the receiver is coupled to a sweeping wavemeter through a small coupling capacitor. This coupling capacitor is located directly at the oscillator circuit of the receiver and a shielded or unshielded conductor is used to transmit the local oscillator output signal to the wavemeter. Due to signal attenuation over this conductive transmission channel, the coupling conductor must be relatively short, which means that the wavemeter and recording instrument must be located within a few feet of the receiver. Present instruments of the wavemeter type are rather bulky and hence are difficult to conceal or make inconspicuous in the average home. It is possible to use a highly sensitive wavemeter with a long coupling conductor, but there are objections to running such a conductor along the floors or walls of the average home. Further, if the conductor is long, it definitely must be shielded to prevent noise pick-up and to prevent undesired broadcasting of the local oscillator output signal of the receiver. Moreover, the use of a long coupling cable prevents movement of the receiver unless a skilled installation man is available to relocate the receiver. Thus, prior art instruments of the second type are bulky and difficult to make inconspicuous and restrict mobility of the associated receiver. Moreover, one complete and independent instrument is required for each receiver the use of which is to be monitored, thus requiring considerable duplication of equipment in multi-radio collaborator homes.

It is an object of the present invention, therefore, to at least in part obviate the above-mentioned disadvantages of prior art systems and apparatus for recording the transmitting stations to which one or more wave signal receivers are tuned.

It is another object of the present invention to provide improved apparatus and an improved system of the character described which provides for record monitoring of a plurality of receivers with a relatively small amount of apparatus, the majority of which may be located at any desired point distant from the receivers, which receivers may be of the multi-band type including amplitude modulation, frequency modulation and television channels.

It is another object of the present invention to provide a new and improved arrangment for use with any receiver of the superheterodyne type including simple and compact facilities which may easily be installed in a receiver cabinet for supplying to a remote recording point a signal having a variable characteristic uniquely representative of particular transmitting stations to which the receiver is tuned for program reception and furthermore to produce signals uniquely representative of a particular receiver where a plurality of receivers in a multiple receiver home are monitored.

Still another object of the present invention is to provide new and improved apparatus for producing information relative to the particular transmitting station to which a wave signal receiver is tuned, including means for scanning the frequency spectrum in a stepwise manner together with means for producing an indication of the particular transmitting station to which a receiver is tuned by the position of said transmitting station with reference to a series of discrete steps in said frequency spectrum.

It is another object of the present invention to provide an improved apparatus for recording the listening habits of wave signal receiver users in a readily decodable manner.

It is a further object of the present invention to provide by means of a plurality of bursts of electrical energy an indication of the particular transmitting station to which a wave signal receiver is tuned, the number of bursts of energy occurring during each time interval such as each minute being representative of the particular transmitting station.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which.

Figures 2, 3A:
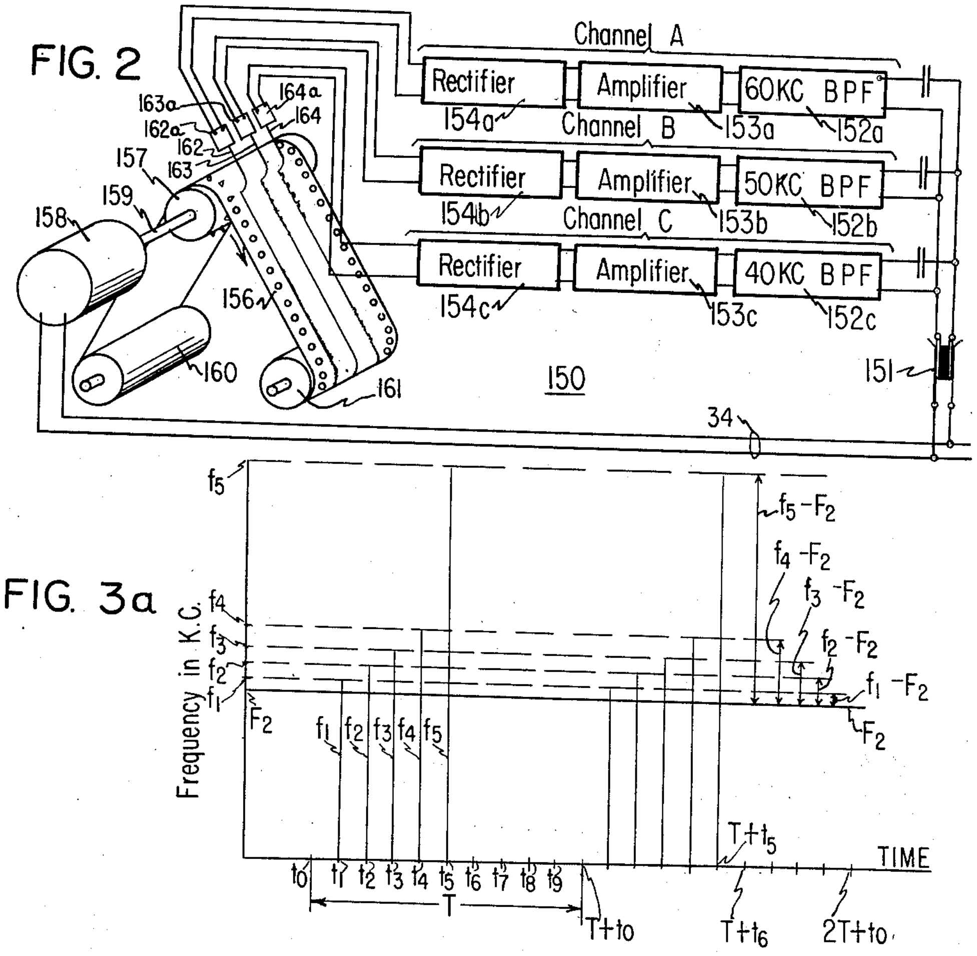
Fig. 2 is a schematic diagram of a recorder unit adapted to record information supplied by a plurality of units of the type shown in Fig. 1 which are associated with a plurality of receivers.

Fig. 3*a* is a graph of frequency vs. time indicating a plurality of discrete frequencies which might be employed in scanning the amplitude modulation frequency range.

Figure 3B:
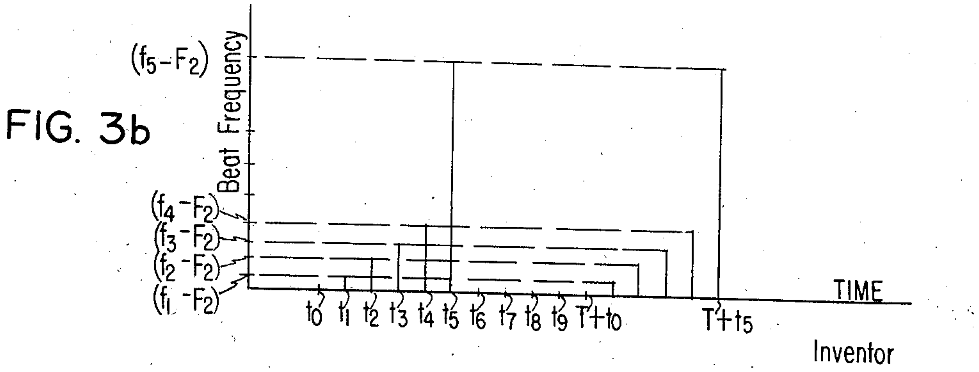

Fig. 3*b* is a graph similar to Fig. 3*a* showing the beat frequency impulses generated as a result of heterodyning the discrete frequencies of Fig. 3*a* with the signal from the local oscillator of a receiver when tuned to a particular broadcasting station.

Figure 4:
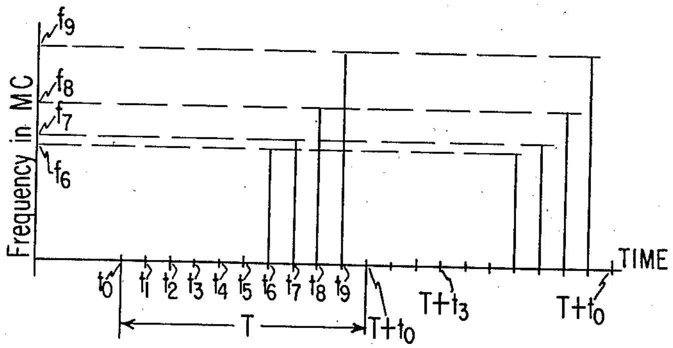

Fig. 4 is a graph similar to Fig. 3*a* of the frequency modulation and television frequency range.

Figure 1:
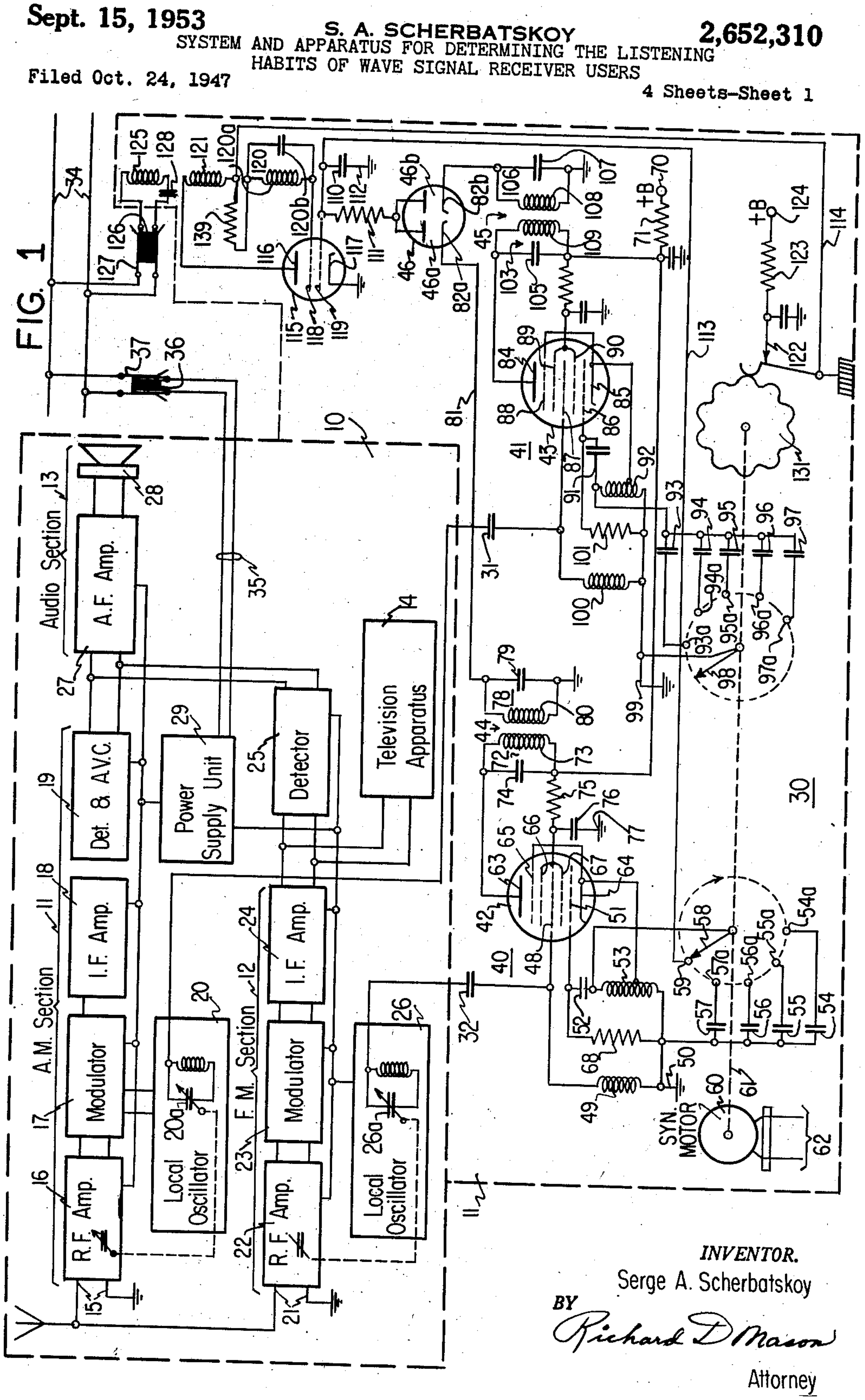
Fig. 1 is a schematic diagram of a multiple band radio receiver and associated apparatus for producing a signal uniquely representative of the particular transmitting station to which said receiver is tuned as well as uniquely representative of the particular receiver.
Figure 5:
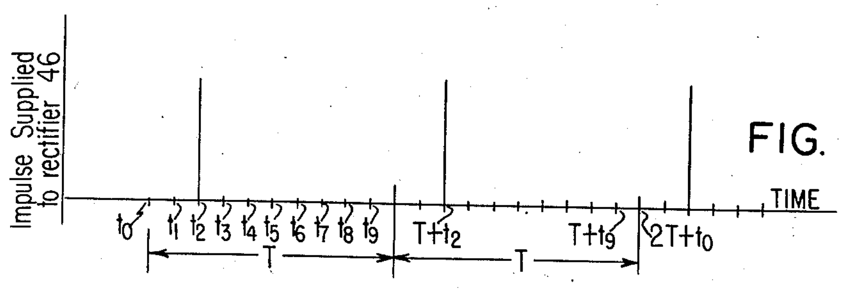

Fig. 5 is a graph of periodically recurring characteristic beat impulses existing at the input to a rectifier or detector employed in the apparatus of Fig. 1 when the particular radio transmitting station considered in connection with Fig. 3*b* is tuned in by the wave signal receiver of Fig. 1.

Figure 6:
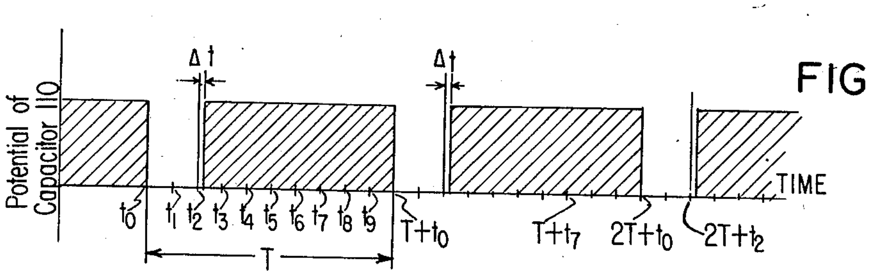

Fig. 6 is a graph illustrating certain electrical characteristics of the apparatus of Fig. 1 when the wave signal receiver of Fig. 1 is tuned to the particular transmitting station considered in Figs. 3*b* and 5.

Figure 7:
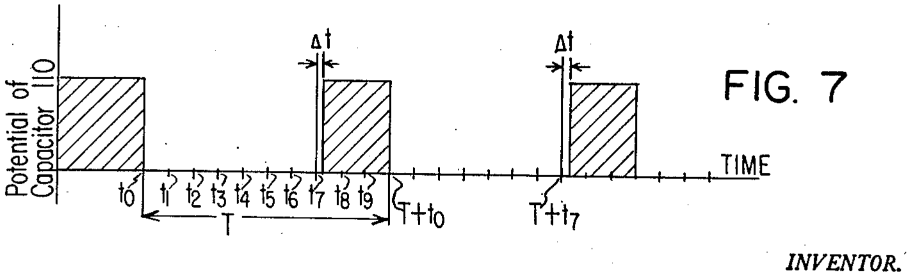

Fig. 7 is a graph similar to the graph of Fig. 6 but representative of certain conditions when a different radio transmitting station is tuned in by the receiver of Fig. 1.

Figure 8:
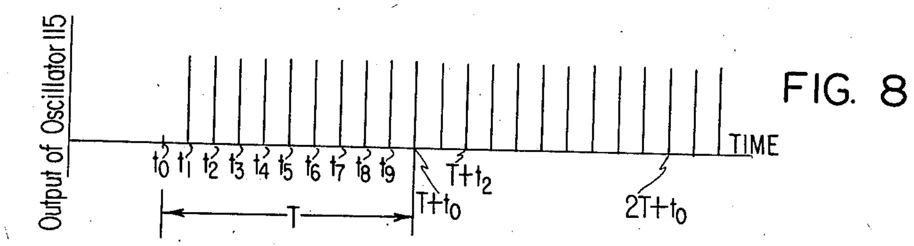

Fig. 8 is a graph illustrating the output of an oscillator associated with the apparatus of Fig. 1 when no biasing voltage is applied thereto.

Figure 9:
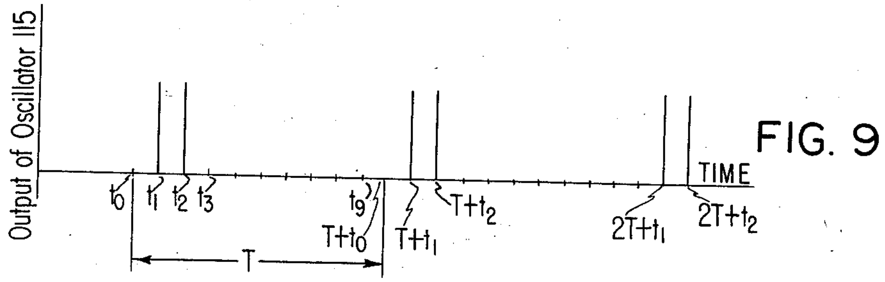

Fig. 9 is a graph similar to Fig. 8 indicating the output of the oscillator when the wave signal receiver of Fig. 1 is tuned to the particular broadcasting station corresponding to the one considered in connection with the graphs of Figs. 5 and 6.

Figure 10:
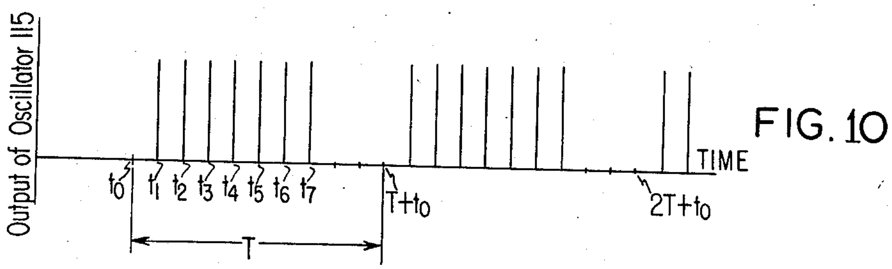
Figure 11:
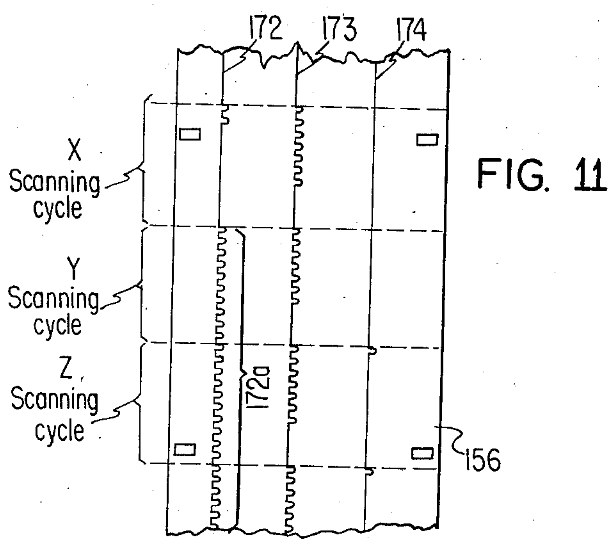

Fig. 10 is a graph similar to Fig. 9 but with the wave signal receiver of Fig. 1 tuned to the radio transmitting station corresponding to the one considered in connection with the graph of Fig. 7, and Fig. 11 is an enlarged section of a recording element with representative records made thereon by the recording device of Fig. 2 when three separate receivers each employing an apparatus similar to that disclosed in Fig. 1 are monitored.

It should be understood that the present invention is particularly applicable to a system for monitoring the receivers in a multi-receiver home, in which case the apparatus of Fig. 1 would be duplicated in dependence upon the number of receivers in the home. The apparatus of Fig. 2 is illustrated as capable of recording the information from three separate receivers. It will be understood that the system and apparatus is capable of functioning where one or more receivers in a home are to be monitored and the apparatus is especially adaptable for use in multi-receiver homes.

The signal producing apparatus of Fig. 1 is illustrated as being applied to a wave signal receiver which is capable of receiving amplitude modulation signals, as well as frequency modulation signals including television signals. It will be understood that the invention is equally applicable to simple receivers operating in only a single frequency band in which case the apparatus would be considerably simplified. The more complete disclosure is included in order to show the more general application of the present invention.

Referring now to Fig. 1 of the drawings there is disclosed and briefly described hereinafter a system for determining the listening habits of radio receiver users in order that the apparatus of the present invention associated therewith may better be understood. It is assumed that for a three-receiver home, three separate units such as shown in Fig. 1 which is illustrated together with the associated wave signal receiver, will be employed, each unit capable of transmitting three different signals representative of the particular wave signal receiver involved, to a recording unit such as is shown in Fig. 2 of the drawings. The signal transmission between a unit such as is disclosed in Fig. 1 and the recording unit of Fig. 2 may be by space link or as illustrated by a suitable conductor link which may comprise the house wiring circuit of the particular home under consideration. The signals from three separate units of the type disclosed in Fig. 1 would preferably differ as far as identifying the wave signal receiver is concerned with respect only to the carrier frequency involved. As an example three separate units of the type illustrated in Fig. 1 may be capable of producing signals having carrier frequencies of 40, 50 and 60 kilocycles respectively. Since the units such as are disclosed in Fig. 1 would be identical for each receiver being monitored these units have not been duplicated in the drawings, but it should be understood that with the recording unit shown in Fig. 2, three units such as are illustrated in Fig. 1 would be employed.

The wave signal receiver illustrated by the reference numeral 10 in Fig. 1 forms no part of the present invention but is merely representative of a wave signal receiver which may be monitored by the apparatus and system of the present invention. As illustrated this wave signal receiver comprises an amplitude modulation section generally designated at 11, a frequency modulation section generally designated at 12, an audio frequency section generally designated at 13, and a television recording section generally designated at 14. It will be understood that the various sections of the receiver 10 are entirely conventional. The amplitude modulation section 11 preferably comprises an antenna ground circuit designated at 15, a tunable radio frequency amplifier 16, a mixer or modulator 17, an intermediate frequency amplifier 18, and a detector and automatic gain control unit 19 connected in tandem in the order named. The usual local or beat frequency oscillator 20 is associated with the mixer or modulator 17, whereby the received program signal carrier is heterodyned to a fixed intermediate frequency.

The frequency modulation section 12 of the wave signal receiver 10 is illustrated as comprising an antenna ground circuit 21 which may be identical with the circuit indicated at 15 associated with amplitude modulation section of the receiver 10. In addition to the antenna ground circuit 21 the frequency modulation section includes a tunable radio frequency amplifier 22, a modulator 23, an intermediate frequency amplifier 24 and a detector 25 connected in tandem in the order named. A local or beat frequency oscillator 26 is connected to the mixer or modulator 23 in the conventional manner. The outputs of the detector units 19 and 25 are each connected to an audio frequency amplifier 27 and thence to a speaker or signal reproducer 28 forming a part of the audio frequency section 13 of the receiver 10.

For the purpose of supplying filament current to the wave signal receiver 10 as well as screen and anode potentials for the electron discharge tubes provided in the various stages of the receiver 10 a suitable power supply unit specifically designated by the reference numeral 29 is provided which forms an integral part of the receiver 10. This power supply unit 29 is adapted to be excited from the usual 110 volt alternating current source specifically designated at 34 over a power supply cord 35 which is connected to the source 34 through a conventional plug connector including the plug 36 and the socket 37. It will be understood that the power source 34 forms a part of the current distribution system for the dwelling in which the receiver 10 is located and these conductors extend to or are parallel connected with other conductors in different rooms of the dwelling.

In general the receiver 10 as described above is entirely conventional in arrangement and its mode of operation is well understood by those skilled in the art. Briefly, however, program modulated signal carriers intercepted by the antenna ground circuits 15 or 21 are selectively transmitted through the amplitude modulation or frequency modulation sections wherein they are selected and amplified by the tunable radio frequency amplifiers 16 or 22, converted into a modulated carrier of fixed frequency at the mixer or modulator stages 17 or 23, further selected and amplified in the intermediate frequency amplifiers 18 or 24 and detected in the detector units 19 or 25. The program or modulation components developed in the units 19 or 25 are amplified by the audio-frequency amplifier 27 and delivered to the loud speaker or signal re-producer 28. In the event of television signals they are delivered from the unit 24 to the television apparatus 14 for reproduction. Automatic gain control of one or more of the receiver stages 16, 17 and 18 under the control of the gain control bias developed in the unit 19 is accomplished in an entirely conventional manner. Selection of different desired program modulated signal carriers originating at different transmitting stations is of course accomplished by adjustment of the tuning elements of the tunable radio frequency amplifiers 16 or 22 and to an even greater extent by adjustment of the tuning means such for example as the tuning condensers 20a and 26a of the local oscillators 20 and 26 respectively to vary the output frequency of these oscillators.

With superheterodyne receivers of the type illustrated by the reference numeral 10 the reception of any program carrier from a given wave signal transmitter will be represented by a definite output frequency of the local oscillator of each receiver or the local oscillators of a receiver such as 10 having a plurality of signal channels. These output frequency signals of the local oscillators such as 20 and 26 may be used to identify the particular transmitting stations to which the receiver 10 is tuned for program reception at any particular time. In accordance with the present invention the output of the local oscillator 20 is supplied through a suitable coupling capacitor 31 to a unit which might be referred to as a transmitting unit or receiver attachment generally designated at 30, which unit forms an essential part of the present invention and is described in detail hereinafter. Similarly the output of the local oscillator 26 is connected through a suitable coupling capacitor 32 with the unit 30 to be described hereinafter. In either case the signals supplied through coupling capacitor 31 or 32 are representative of the particular radio transmitting station to which the wave signal receiver is tuned.

Although the apparatus disclosed and described in this application is preferably disposed in a single home of the single or multireceiver type it should be understood that in actual practice several hundred broadcast receivers located in homes within the radiation areas of different sets of wave signal transmitters which are broadcasting the particular programs of interest are monitored to provide the record information concerning the listening habits of the receiver users necessary to a statistical analysis from which the various factors affecting the sales effectiveness of particular programs may be accurately arrived at. In using the system it is contemplated that selection of the system collaborator homes—that is the homes in which wave signal receiver use is to be logged—shall be on a basis such that all of the variable factors, such for example, as the number of potential listeners, economic affluence, religion, etc., which normally affect any process of sampling public opinion are accounted for on a weighted basis. In the interests of simplifying the disclosure, however, the transmitter and recording units for only a single multi-receiver home are shown in Figs. 1 and 2 of the drawings.

In accordance with the present invention the transmitting unit 30 is capable of converting the signal frequencies from the local oscillators 20 and 26 to indications uniquely identifying the particular transmitting station to which the wave signal receiver 10 is tuned which indications are readily capable of being recorded so that a record may be obtained of the tuning condition of the wave signal receiver 10 with respect to time. Furthermore the recordings are such as to be readily decoded. In order that a plurality of wave signal receivers such as 10 may be monitored in a multireceiver home the transmitter unit 30 should also be capable of producing indications uniquely identifying the receiver 10 as well as the transmitting stations to which the wave signal receiver 10 is tuned.

Accordingly the transmitter unit 30 is provided with means for continually scanning the frequency spectrum within the range of the frequencies of the local oscillators 20 and 26. In order to simplify the construction and still provide an arrangement for scanning the whole frequency spectrum including the amplitude modulation, frequency modulation, and the television bands, the transmitter unit 30 is provided with a stepwise scanning arrangement wherein the frequency spectrum is scanned in a finite number of steps, each step corresponding to a receivable transmitting station. It will be understood that in any particular locality the number of transmitting stations to which a receiver is generally tuned is fairly limited. One factor which limits the number of transmitting stations is of course the relative ranges of the receiver and transmitting stations. In addition the advantageous reception obtainable from a finite number of stations over the reception of other stations which might be tuned in but whose transmitting characteristics are not too favorable for good program reception mitigates against tuning the receiver to more than a limited number of transmitters. When it is desired to scan the entire frequency spectrum with a multiple band wave signal receiver such as 10, band switching is generally required in any event so that the employment of a stepwise switching arrangement does not involve much added apparatus.

In accordance with the present invention the transmitter unit 30 embodies the principle whereby each of a finite number of frequency channels is given an arbitrary index which has no simple relationship to its frequency and this index is recorded thereby giving an accurate indication of the transmitting station tuned in by the receiver 10 at any particular time. Such an arrangement enables the employment of a plurality of fixed circuit parameters, which involves a simple design problem from the standpoint of accuracy and stability as compared with the difficult design problems involved where continually variable parameters are employed. As will be brought out hereinafter a signal representative of the station index may be produced by utilizing the same switch mechanism which is used in switching from channel to channel thus considerably simplifying the mechanism. The apparatus associated with the receiver 10 can be of relatively small bulk as will become apparent particularly where the wave signal receiver involves only a single band.

The transmitter unit 30 of the present invention is essentially a small relatively insensitive receiver which could be of any type but which is specifically illustrated as of the superheterodyne type. In view of the dual band receiver 10 being monitored, the receiver in the transmitter unit 30 is also a dual band receiver and comprises two oscillator modulator units or converters 40 and 41 respectively, each including a pentagrid converter 42 and 43 respectively. The receiver in the transmitter unit 30 furthermore includes band pass filters 44 and 45 to which the outputs of the units 40 and 41 respectively are connected. The signals passed by the band pass filters 44 and 45 are in turn supplied to a detector or rectifier unit 46 which is provided with two discharge paths 46*a* and 46*b* respectively whereby the signals transmitted by both band pass filters 44 and 45 are detected.

Referred now specifically to the modulator unit 40 of the transmitter unit 30, it may be observed that the pentagrid converter 42 includes an anode 63, a cathode 64, a first control grid 51, a second control grid 48, a suppressor grid 65 and screen grids 66 and 67. The second control grid 48 is connected to the coupling capacitor 32 so as to receive the signal from local oscillator 26. In order to provide a path to ground for direct current a suitable radio frequency choke coil 49 is connected to the grid 48, which choke coil is grounded as indicated at 50. The first control grid 51 is connected to the tank circuit of an oscillator unit through a suitable coupling capacitor 52. The tank circuit includes an inductance 53 successively adapted to be connected in parallel with each of a plurality of capacitors 54, 55, 56 and 57. One common terminal of each of the capacitors 54 and 57 inclusive is connected to one terminal of inductance 53 of the tank circuit while the other terminals of the capacitors are connected to the switch contacts 54*a*, 55*a*, 56*a* and 57*a* respectively which are adapted to be engaged by a movable contact or wiper 58 which in turn is connected to the other terminal of the inductance 53 of the tank circuit. The switch contacts 54*a* to 57*a* inclusive are uniformly spaced in an arcuate manner so as to be successively contacted by the switch arm 58 upon rotation thereof. In addition to these contacts which have been mentioned an additional contact 59 is provided which is spaced from the contact 57*a* by substantially the same amount as the spacing between the other contacts and furthermore is adapted to be engaged by the wiper 59. The contacts 54*a* to 57*a* and 59 substantially define a semi-circle with the contacts peripherally arranged to provide with the wiper 58 a rotary switch mechanism.

For the purpose of rotating the switch arm 58 at a uniform speed to produce a switching operation relative to the contacts 54*a*, 55*a*, 56*a*, 57*a* and 59 there is provided a synchronous motor 60 drivingly connected to the switch arm or wiper 58 by any suitable means indicated at 61. The synchronous motor is energized from any source of power designated at 62 and preferably is arranged to drive the arm 58 at a speed of one revolution per minute in a clockwise direction as viewed in Fig. 1.

The cathode 64 of the pentagrid converter 42, for feed back purposes, is connected to an intermediate point on the inductance 53 of the tank circuit. A suitable grid leak resistor 68 is connected between the control grid 51 and ground 50. It will be understood that rotation of the contact arm or wiper 58 will cause the frequency of the oscillator associated with the oscillator modulator unit 40 to vary in a stepwise manner so that a stepwise varying beat frequency will be obtained in the plate circuit of the electron discharge valve 42 by virtue of heterodyning the signal frequency of the local oscillator 26 with the output of the oscillator section of the converter 40. The plate circuit of the oscillator modulator unit 40 is connected to a source 70 of +B potential through a resistor 71 and a tuned circuit 72 comprising an inductance 73 and a capacitor 74. The screen grids 66 and 67 arranged in parallel are also connected to the source 70 of +B potential, through a voltage dropping resistor 75. A suitable high frequency by pass condenser 76 is connected between the screen grids 66 and 67 and ground which is indicated at 77.

It will be apparent that the tuned circuit 72 forms a part of the band pass filter 44 which further includes a turned circuit 78 including the capacitor 79 and the inductance 80, which inductance is coupled with the inductance 73. As will be better understood in the light of the ensuing description, preferably the band pass filter 44 is designed so as only to pass signals of a predetermined frequency and by way of example only frequencies of the order of one megacycle. The output of this band pass filter 44 is connected through a suitable conductor 81 with the cathode 82a of the discharge path 46a of the rectifier 46.

The oscillator modulator unit or converter 41 of the transmitter unit 30 is substantially identical with that of the unit 40 described above. The pentagrid converter 43 comprises an anode 84, a cathode 85, a first control grid 86, a second control grid 87, a suppressor grid 88 and a pair of parallel connected screen grids 89 and 90. The second control grid 87 is connected to the coupling capacitor 31 so as to receive signals from the local oscillator 28 of the wave signal receiver 10. These signals will be of the order of 1,000 to 2,000 kilocycles in frequency for the standard broadcast band of 550 to 1550 kilocycles. The first control grid 86 is connected to the tank circuit of an associated oscillator unit, through a coupling capacitor 91. The tank circuit comprises the inductance 92 and one of a plurality of capacitors 93, 94, 95, 96, and 97 which are arranged to be successively connected in the tank circuit. Each of these capacitors 93 to 97 inclusive has one terminal thereof connected to one terminal of the inductance 92. The other terminals of the capacitors 93 to 97 inclusive are connected to contacts 93*a*, 94*a*, 95*a*, 96*a*, and 97*a* respectively, peripherally arranged in spaced relationship so as to form with a movable arm or wiper 98 a rotary switch mechanism. The movable arm 98 is rotatable about an axis to successively engage the contact members 93*a*, 94*a*, 95*a*, 96*a*, and 97*a* in that order during one cycle of rotation thereof. The movable switch arm 98 is connected to the other terminal of the inductance 92 which connection is grounded as indicated at 99. The cathode 85 is connected to an intermediate point on the inductance 92 to produce the desired feed back. A suitable radio frequency choke coil 100 is connected between ground 99 and the second control electrode 87 and a grid leak resistor 101 is connected between the first control electrode 86 and ground. Preferably the movable contact 98 is drivingly connected to the synchronous motor 60 so as to be movable with the wiper 58. The wipers 58 and 98 are furthermore so related to each other that the switch contacts of the oscillator modulator unit 41 and the oscillator modulator unit 40 are successively engaged at equally spaced time intervals during one revolution which amounts to one scanning cycle. This can be accomplished as illustrated by having the wipers 58 and 98 fastened to the driving shaft so as always to be in the same angular position, and the contacts 93*a*, 94*a*, 95*a*, 96*a*, 97*a*, 54*a*, 55*a*, 56*a*, 57*a* and 59 arranged so as to be successively engaged in that order by one or the other of the wipers 58 and 98.

The plate circuit of the pentagrid converter 43 includes the tuned circuit 103 comprising the inductance 109 and the capacitor 105. The source 70 of +B potential is connected to the anode 84 through the resistor 71 and the tuned circuit 103. The tuned circuit 103 comprises a portion of the band pass filter 45 which includes an additional tuned circuit 106 comprising the capacitor 107 and the inductance 108 inductively coupled with the inductance 103. The band pass filter 45 is also designed so as only to pass signals of a predetermined frequency and by way of example only frequencies of the order of 100 kilocycles. The output of the band pass filter 45 is connected to the cathode 82*b* of the discharge path 46*b* of the detector or rectifier 46.

In order to provide a cyclic control potential indicative of the transmitting station to which the wave signal receiver 10 is tuned the rectified potential obtained through operation of the detector or rectifier 46 is supplied to a capacitor 110 through a current limiting resistor 111. The capacitor 110 is connected to ground as indicated at 112. When a potential is applied to the detector 46 it will be apparent that the condenser 110 is charged. The ungrounded terminal of the condenser 110 is connected by means of a conductor 113 with the terminal 59 of the switching unit comprising the rotatable arm 58. Whenever the switch arm 58 engages the contact 59, which might be considered a reference terminal, the condenser 110 is provided with a discharge path to ground 50 through the conductor 113, the switch arm 58, and the inductance 53.

Although the stepwise switching means comprising the rotatable arms 58 and 98 have been described as including only nine switch points representative of nine transmitting stations it will be apparent that this could readily be multiplied so as to scan eighteen or twenty-seven channels for very large receivers. The number of channels is immaterial as far as the present invention is concerned and the nine channel unit is illustrated by way of example only. With a nine channel unit as illustrated it is possible to obtain information regarding five amplitude modulation transmitting stations having frequencies $F'_1$, $F'_2$, $F'_3$, $F'_4$ and $F'_5$ as well as four frequency modulation and television channels having frequencies $F'_6$, $F'_7$, $F'_8$ and $F'_9$ respectively. By way of example such transmitting stations might be identified in accordance with the following table:

*Table I*

| Identifying or Index Number N | Frequency | Corresponding to Station |
|---|---|---|
| 1 | $F'_1$=660 kc | Broadcast Station WEAF. |
| 2 | $F'_2$=720 kc | Broadcast Station WOR. |
| 3 | $F'_3$=770 kc | Broadcast Station WJZ. |
| 4 | $F'_4$=880 kc | Broadcast Station WABC. |
| 5 | $F'_5$=1,550 kc | Broadcast Station WQXR. |
| 6 | $F'_6$=45.5 mc | FM Station WFGG. |
| 7 | $F'_7$=47.5 mc | FM Station WABF. |
| 8 | $F'_8$=61.25 mc | Television Channel No. 3 (sound). |
| 9 | $F'_9$=83.25 mc | Television Channel No. 6 (sound). |

If the intermediate frequency of the unit 17 is 455 kilocycles and the intermediate frequency of the unit 24 is 4.5 megacycles, then Table I might be expressed in the following manner.

*Table II*

| Identifying or Index Number N | Output Frequency of Local Oscillators 20 or 26 | Corresponding to Station |
|---|---|---|
| 1 | $F_1$=1,115 kc | Broadcast station WEAF. |
| 2 | $F_2$=1,175 kc | Broadcast station WOR. |
| 3 | $F_3$=1,225 kc | Broadcast station WJZ. |
| 4 | $F_4$=1,335 kc | Broadcast station WABC. |
| 5 | $F_5$=2,005 kc | Broadcast station WQXR. |
| 6 | $F_6$=50 mc | FM Station WFGG. |
| 7 | $F_7$=52 mc | FM Station WABF. |
| 8 | $F_8$=65.75 mc | Television Channel No. 3 (sound). |
| 9 | $F_9$=87.75 mc | Television Channel No. 6 (sound). |

In accordance with the present invention the oscillator sections of the modulator units 40 and 41 are capable of producing frequencies which will be designated hereinafter as search frequencies. In tuning the converter 41 in a stepwise manner the frequencies $f_1$, $f_2$, $f_3$, $f_4$, and $f_5$ are produced in response to the insertion of the capacitors 93, 94, 95, 96 and 97 respectively into tank circuit through rotation of the wiper or switch arm 98. These frequencies $f_1$, $f_2$, $f_3$, $f_4$, and $f_5$ are designated as the amplitude modulation search frequencies. Similarly the oscillator circuit of the converter 40 is tuned in stepwise manner to successively produce the discrete frequencies $f_6$, $f_7$, $f_8$, and $f_9$, upon the insertion of the capacitors 54, 55, 56 and 57 respectively into the tank circuit of the converter or modulator unit 40. These frequencies $f_6$, $f_7$, $f_8$, and $f_9$ are designated as the frequency modulation and television search frequencies.

In view of the fact that the band pass filter 45 has been designated as passing only signal frequencies of the order of 100 kilocycles and the band pass filter 44 has been indicated as capable of passing only signal frequencies of the order of one megacycle, the search frequencies $f_1$, $f_2$, $f_3$, $f_4$, and $f_5$, are chosen so as to differ by 100 kilocycles from the frequencies $F_1$, $F_2$, $F_3$, $F_4$, and $F_5$ respectively of the oscillator 20 when tuned to stations 1, 2, 3, 4 and 5 respectively as set forth in Tables I and II. Likewise the search frequencies $f_6$, $f_7$, $f_8$, and $f_9$, for the frequency modulation and television channels are chosen so as to differ by one megacycle from the frequencies $F_6$, $F_7$, $F_8$, and $F_9$ respectively produced by the oscillator 26 when tuned to stations 6, 7, 8, and 9 respectively. Accordingly, in the following table are set forth the particular search frequencies which would be employed in the examples set forth above.

*Table III*

| Identifying or Index Number N | Search Frequency | Corresponding Tuning Condenser | Corresponding Station |
|---|---|---|---|
| 1 | $f_1$=1,215 kc | 93 | Broadcast Station WEAF. |
| 2 | $f_2$=1,275 kc | 94 | Broadcast Station WOR. |
| 3 | $f_3$=1,325 kc | 95 | Broadcast Station WJZ. |
| 4 | $f_4$=1,435 kc | 96 | Broadcast Station WABC. |
| 5 | $f_5$=2,105 kc | 97 | Broadcast Station WQXR. |
| 6 | $f_6$=51.0 mc | 54 | FM Station WFGG. |
| 7 | $f_7$=53.0 mc | 55 | FM Station WABF. |
| 8 | $f_8$=66.75 mc | 56 | Television Channel No. 3 (sound). |
| 9 | $f_9$=88.75 mc | 57 | Television Channel No. 6 (sound). |

It is apparent that if the synchronous motor 60 rotates the wipers or switch arms 58 and 98 at a speed of one revolution per minute and the contacts engaged thereby are uniformly spaced that the search frequencies $f_1$, $f_2$, $f_3$, $f_4$, $f_5$, $f_6$, $f_7$, $f_8$, and $f_9$ will be produced in stepwise fashion, the frequencies $f_1$, $f_2$, $f_3$, $f_4$ and $f_5$, being produced in the converter 41 and the frequencies $f_6$, $f_7$, $f_8$ and $f_9$, being produced in the converter 40. Assume for example that the wipers 58 and 98 are initially in the position indicated in Fig. 1 of the drawings with the wiper 58 engaging the reference contact 59. This time might be arbitrarily designated at time $t_0$. As the scanning progresses the wiper 98 contacts successively the terminals 93*a*, 94*a*, 95*a*, 96*a* and 97*a* at corresponding instants $t_1$, $t_2$, $t_3$, $t_4$ and $t_5$. During this interval of time the wiper 58 leaves the reference terminal or contact 59 and moves through space until the wiper 98 leaves the contact terminal 97*a*, whereupon the wiper 58 successively engages the contacts 54*a*, 55*a*, 56*a*, 57*a* and 59 at the corresponding instants $t_6$, $t_7$, $t_8$, $t_9$, and $T+t_0$, where T is the period of one scanning cycle. The reference terminal 59 is periodically contacted at the beginning of each scanning period. Due to the uniform distribution of the contacts 93*a*, 94*a*, 95*a*, 96*a*, 97*a*, 54*a*, 55*a*, 56*a*, 57*a* and 59 and furthermore because of the uniform angular motion of the wipers 58 and 98, the instants $t_0$, $t_1$, $t_2$, $t_3$, $t_4$, $t_5$, $t_6$, $t_7$, $t_8$, $t_9$, and $T+t_0$ etc., succeed each other by equal time intervals. The occurrence of the search frequency impulses with reference to time are diagrammatically illustrated in Figs. 3*a* and 4. Two complete cycles are shown in Fig. 3*a* of the search frequency impulses $f_1$, $f_2$, $f_3$, $f_4$, and $f_5$ and similarly two complete cycles of the search frequency impulses $f_6$, $f_7$, $f_8$, and $f_9$, are shown in Fig. 4. The frequency scale in Fig. 4 is in megacycles while the frequency scale in Fig. 3*a* is in kilocycles.

Assume for example that a particular broadcasting station such as station No. 2 in Table I is tuned in by wave signal receiver 10. This station has a transmitting frequency of $F'_2$ kilocycles and the local oscillator 20 supplies a frequency of $F_2$ to the control grid 87 of the converter tube 43. It will be apparent that under these conditions a beat frequency will be produced by the heterodyne action which beat frequency will vary successively with the search frequencies, as the search frequency impulses $f_1$, $f_2$, $f_3$, $f_4$, and $f_5$ are produced the beat frequencies of $(f_1-F_2)$, $(f_2-F_2)$, $(f_3-F_2)$, $(f_4-F_2)$ and $(f_5-F_2)$ are successively produced. These beat frequencies are indicated in Fig. 3*a* and the time of occurrence thereof for two cycles or two periods is specifically designated in Fig. 3*b* of the drawings. During the portion of the scanning cycle when the search frequencies $f_6$, $f_7$, $f_8$, and $f_9$ are produced when the wave signal receiver 10 is tuned to the transmitter whose frequency is $F'_2$ no beat frequency impulses are produced because local oscillator 20 is not connected to the converter 40. In view of the fact that the band pass filters 44 and 45 will only pass signal frequencies of one megacycle and 100 kilocycles respectively, only the frequency occurring at the instant $t_2$, $(T+t_2)$, $(2T+t_2)$, etc., will be passed by the band pass filter 45 since only at those instants is the beat frequency output of the converter unit 41 equal to 100 kilocycles. Fig. 5 represents the impulses applied to the rectifier or detector unit 46 for three scanning cycles when the station having a transmitting frequency $F'_2$ is tuned in by the wave signal receiver 10. It will be understood that if any other transmitting station is tuned in by the wave signal receiver 10 impulses coresponding to those in Fig. 5 will be applied to the rectifier 46, which impulses will occur at the instants $(t_N)$, $(T+t_N)$, $(2T+t_N)$, etc., where N is the index number of the particular transmitting station to which the wave signal receiver is tuned. It will be apparent therefore that there has been provided an arrangement whereby an indication of the particular transmitting station is obtained in dependence upon its arbitrary position in a stepwise scanning cycle.

For the purpose of producing readily recordable indications which are capable of uniquely identifying the receiver 10 as well as the particular transmitting station to which the receiver may be tuned there is provided in accordance with the present invention an oscillator including the electron discharge tube 115 which comprises an anode 116, a cathode 117 and a pair of control electrodes or grids 118 and 119. This oscillator also includes a winding 120*a* and a capacitor 120*b* arranged in a tank circuit 120 which is connected to the control electrode 118 whereby the oscillator is caused to produce an output having a frequency of a predetermined constant value such as 60 kilocycles for example. The plate circuit of the electron discharge tube 115 which includes a suitable winding 121, a conductor 114, a switch 122, and a current limiting resistor 123 is connected to a source 124 of +B potential. The cathode 117 of the tube 115 is grounded as indicated. If the switch 122 remains closed, an oscillator output having a frequency determined by the tank circuit 120 such as 60 kilocycles or the like is produced in the winding 121 which is preferably inductably coupled with a winding 125 suitably connected to the house wiring circuit 34 as by a plug connector comprising the members 126 and 127. A capacitor 128 is preferably provided in this circuit to prevent the transfer of currents having frequencies substantially below the 60 kilocycle frequency produced by the oscillator including the tube 115. The windings 120*a*, 121 and 125 essentially act as a three-winding transformer. A suitable resistor 139 is provided to control the application of the proper potential to the grid 118.

In accordance with the present invention the switch 122 is cyclically operated as by means of a rotatable cam 131 which is driven by the synchronous motor 60. Preferably cam 131 is provided with ten protrusions equally spaced and arranged so as to cause the switch 122 to close each time that the wipers 58 or 98 engage one of their associated contacts. In other words the cam 131 causes switch 122 to close at the instants $t_0$, $t_1$, $t_2$, $t_3$, $t_4$, $t_5$, $t_6$, $t_7$, $t_8$, $t_9$, $T+t_0$, $T+t_1$, etc. With this arrangement it is apparent that without the provision of control electrode 119, the oscillator including the tube 115 will produce bursts or impulses of 60 kilocycle energy at the instants $t_0$, $t_1$, $t_2$, etc., as indicated by Fig. 8 of the drawings.

In accordance with the present invention the capacitor 110 is connected to the control electrode 119 in a manner such that when capacitor 110 is charged the voltage applied to control electrode 119 renders oscillator tube 115 non operative. Considering as an example the condition when the station having a transmitting frequency of $F'_2$ is tuned in by the wave signal receiver 10, it will be apparent from an examination of the curves of Fig. 5 that a voltage will be applied to the capacitor 110 at the instants $t_2$ during every scanning cycle and the capacitor 110 remains charged from the time $t_2$ until the time $T+t_0$ etc., when the capacitor 110 is discharged by engagement of the wiper 58 with the reference terminal 59. By virtue of the resistance 111 a small interval of time $\Delta t$ expires before the capacitor 110 is charged. Fig. 6 illustrates the voltage conditions of the capacitor 110 for the condition when the wave signal receiver 10 is tuned to the transmitting station having a transmitting frequency of $F'_2$ and an index number of $N=2$, the shaded areas indicating the periods when the condenser 110 is charged. When the wave signal receiver 10 is tuned to the transmitting station having the frequency $F'_7$ the cyclic voltage condition of the condenser or capacitor 100 is represented by Fig. 7 of the drawings with the shaded areas again indicating the charged periods of the condenser. It will be apparent that depending upon the particular station which is tuned in by the wave signal receiver 10, the capacitor 110 will be charged for variable periods of time during each scanning cycle and will be discharged at the end of each scanning cycle by the engagement of the wiper 58 with the reference terminal 59.

In view of the fact that control electrode 119 is connected to the ungrounded terminal of the capacitor 110 the voltage of the capacitor 110 will also be the voltage of the control electrode 119. Consequently when the station having a transmitting frequency of $F'_2$ is tuned in by the wave signal receiver 10 the oscillator 115 is capable of producing bursts of 60-kilocycle energy only at the instants of $t_1$ and $t_2$ during every cycle as is shown by Fig. 9 of the drawings. Similarly when the transmitting station having a frequency of $F'_7$ is tuned in by the wave signal receiver 10 the oscillator tube 115 is capable of producing bursts of 60 kilocycle energy whenever the switch 122 is closed and no voltage exists on the capacitor 110. This is indicated by the curve of Fig. 10 of the drawings. It will be apparent therefore that with the arrangement described N bursts of 60 kilocycle energy will be produced during each cycle where N is the index number of the particular station tuned in by the wave signal receiver 10. If more than one wave signal receiver were provided in a particular home as many transmitter units such as 30 as there are receivers would be provided, one associated with each receiver, and each would have oscillators such as 115 capable of producing bursts of energy of different frequencies but in each case the number of bursts of energy during any scanning cycle would correspond with the index number of the particular station tuned in by the wave signal receiver.

It will be understood that with the transmitter unit 30 of the present invention any suitable recording device may be employed which is preferably disposed in an out-of-the-way place such as a closet or the basement of the home in which the receiver users whose listening habits are being considered live. Such a recorder is illustrated in Fig. 2 of the drawings, where the house wiring circuit is designated by the same reference numerals as in Fig. 1. This recorder unit is designated by the reference numeral 150 and comprises a plurality of channels designated as channel A, channel B, and channel C respectively, so as to record information produced by a plurality of transmitter units such as 30. As illustrated the channels A, B and C are connected to the signal link which is illustrated as the house wiring circuit 34 through a suitable plug connector designated at 151. Each of the channels is identical and the corresponding parts are designated by the same reference numerals marked with an appropriate subscript such as *a*, *b* and *c* respectively. The channel A simply comprises a band pass filter 152*a*, an amplifier 153*a* and a rectifier 154*a* connected in cascade in the order named. The band pass filters 152*a*, 152*b* and 152*c* are arranged so as to pass frequencies which differ from each other so that it is possible to identify the particular wave signal receiver. The frequencies of the band pass filters correspond with the frequency of the oscillator tube 115 of the associated transmitter unit such as 30. As illustrated in Fig. 2 the band pass filter 152*a* is designed to pass only frequencies of 60 kilocycles while the band pass filter 152*b* will pass only frequencies of 50 kilocycles and the band pass filter 152*c* will pass only frequencies of 40 kilocycles. In any event the signals transmitted by the common link 34 can only pass through the particular channel which corresponds to that of a particular wave signal receiver being monitored.

As illustrated in Fig. 2 of the drawings the recorder also comprises a movable recording element 156 which may be any well known type of recording element such as magnetic wire or tape or as illustrated, a record tape having perforations along the edge thereof so as to be drivingly engaged by driving sprocket 157 connected to a suitable driving motor 158 through a shaft 159. The tape is preferably supplied to the sprocket 157 from a suitable supply spool 160 and the exposed tape is wound up on a suitable take up spool 161. In general it is common practice to drive the movable recording element 156 at a constant speed, so that the amount of tape used in a predetermined time interval is indicative of the elapsed time. Preferably therefore the driving motor 158 is a synchronous motor which is illustrative as being connected to the house wiring circuit 34 which is preferably a 60-cycle 110 volt circuit.

Preferably the recorder 150 is of the type capable of making a phonographically reproducible record and is illustrated as of the type disclosed in prior copending Scherbatskoy application (N5) Serial No. 709,017 filed November 9, 1946 and assigned to the same assignee as the present application. In this preferred embodiment the movable recording element 156 comprises cellophane tape. For the purpose of producing high fidelity recording on the cellophane tape 156 a plurality of jewel tipped cutting styli 162, 163 and 164 respectively are provided, associated with the channels A, B and C respectively. These jewel tipped cutting styli 162, 163 and 164 are each preferably pivotally supported as a part of an associated recording head such as 162*a*, 163*a* and 164*a* respectively. When a signal is transmitted through channel A the stylus 162 will be caused to move in accordance with the signal to cut a trace in the cellophane tape 156. It will be understood that this signal will be representative of the bursts of energy produced by the oscillator tube 115. The operation of the other styli 163 and 164 will be identical.

For the purpose of better understanding the type of record produced reference may be had to Fig. 11 of the drawings where the traces 172, 173 and 174 produced by the styli 162, 163 and 164 respectively are shown in greatly magnified form at least as far as the lengthwise scale of the tape 156 is concerned. As illustrated the portion of the tape 156 shown in Fig. 11 contains records produced during three complete scanning cycles which are specifically designated as the X, Y, and Z scanning cycles. If each scanning cycle is of one minute duration the magnified record of Fig. 11 is substantially that recorded during a three-minute interval. An examination of the trace 172 indicates that the particular wave signal receiver associated therewith was tuned to the transmitting station having an index number of $N=2$ during the X scanning cycle since two impulses are recorded indicating that the associated oscillator tube 115 produced two bursts of energy during this cycle. During scanning cycles Y and Z, however, it is noted that ten impulses are recorded during each cycle indicating that the cam 131 was causing the associated oscillator 115 to produce ten bursts of energy during each scanning cycle. It will be apparent therefore that during the scanning cycles Y and Z the wave signal receiver associated with the stylus 162 producing the trace 172 is turned on but is not tuned to any one of the stations for which a corresponding search signal is produced by the transmitter unit 30. In effect, therefore, the portion of trace 172 designated as 172*a* indicates tuning to "all other stations" which means all stations other than those for which a particular search frequency is provided. The recording of such information is fairly important since if the record produced on the movable element 156 indicates that the receivers being monitored are tuned for substantial periods of time to "all other stations" then it may be desirable to produce additional search frequencies during each scanning cycle.

An examination of the trace 173 in Fig. 11 indicates that the particular wave signal receiver associated with the stylus 163 is continuously tuned during all the scanning cycles shown to the transmitter having the index number $N=7$. An examination of the trace 174 indicates that during scanning cycles X and Y the particular wave signal receiver associated with the stylus 164 is turned off, but that during the succeeding scanning cycles for which a trace is indicated in Fig. 11 the associated receiver is turned on and tuned to the station having the index number $N=1$.

The production of a record such as is disclosed in Fig. 11 lends itself very well to decoding. The exposed record tape may be run through a frequency meter or cycle counter which counts the cycles or pulses occurring during each scanning cycle thus permitting ready conversion of "the number of impulses per scanning cycle" to "transmitting station tuned in." It will be understood that the number of receivers being monitored is substantially unlimited as far as a particular recorder 150 is concerned.

The terms phonographic reproducer and phonographically reproducible as used herein denote any system or method of translating the record indications into electrical signals by phonographic pick up means and excludes visual scanning and photographic duplicating processes. Under this definition magnetic records on a magnetic tape or wire may be considered the full equivalent of the cellophane tape system described above.

In view of the detailed description included above, the operation of the system and apparatus of the present invention will be apparent to those skilled in the art. When a particular transmitting station is tuned in by one of the wave signal receivers such as 10 the associated transmitter unit 30 produces bursts of electrical energy of a predetermined frequency indicative of a particular receiver and the number of bursts during each minute is a clear indication of the transmitting station tuned in. When a transmitting station having a frequency of transmission of $F'_2$ is tuned in the bursts of energy applied to the link 34 and consequently to the recorder 150 are represented by Fig. 9 of the drawings. When a transmitting station having a broadcasting frequency of $F'_7$ is tuned in by one of the wave signal receivers such as 10 the associated transmitter unit such as 30 will cause seven impulses to be applied to the associated stylus of the recording device 150 during each cycle. Generally speaking, therefore, when a radio transmitting station having a broadcasting frequency of $F'_N$ is tuned in, N bursts of energy will be produced by the transmitter unit and supplied to the recording element 150 through the link such as 34 where N is the index number of the particular transmitting station.

It will be apparent to those skilled in the art that the present invention is not limited to the particular constructions and arrangements shown and described, but that changes and modifications can be made without departing from the spirit and scope of the invention, and it is aimed in the appended claims to cover all such changes and modifications.

What is claimed as new and desired to be secured by Letters Patent of the United States is:

1. Apparatus for recording information relative to the particular transmitting station to which a wave signal receiver is tuned comprising, means for continually scanning the frequency spectrum by producing a signal varying in frequency in a series of discrete steps during each scanning cycle each frequency step representative of a particular transmitting station, means for producing during each scanning cycle a plurality of periodic signals equal in number to the number of scanning steps, and means responsive to the production of the predetermined one of said frequency steps representative of the transmitting station to which said receiver is tuned for rendering said last mentioned means ineffective for the portion of each scanning cycle remaining after the production of said frequency step, the portion varying in dependence upon the particular transmitting station to which said wave signal receiver is tuned.

2. Apparatus for recording information relative to the particular transmitting station to which a wave signal receiver is tuned comprising means for continually scanning the frequency spectrum by producing a signal varying in frequency in a series of discrete steps during each scanning cycle each frequency step bearing a predetermined frequency relationship with the frequency of transmission of a different transmitting station, means for producing during each scanning cycle a plurality of periodic pulses uniformly displaced with reference to time, and means responsive to the production of the predetermined one of said frequency steps representative of the transmitting station to which said receiver is tuned for rendering said last mentioned means ineffective for the portion of each scanning cycle remaining after the production of said frequency step the portion varying in dependence upon the particular transmitting station to which said wave signal receiver is tuned.

3. Apparatus for producing information relative to the particular transmitting station to which a wave signal receiver is tuned comprising means for continually scanning the frequency spectrum by producing a signal varying in frequency in a series of discrete steps during each scanning cycle each frequency step bearing a predetermined frequency relationship with the transmitting frequency of a different transmitting station, means for producing during each scanning cycle a plurality of bursts of electrical energy of a predetermined frequency which frequency is uniquely representative of said receiver, the number of bursts capable of being produced being at least equal to the number of scanning steps, and means responsive to the production of the predetermined one of said frequency steps representative of the transmitting station to which said receiver is tuned for rendering said last mentioned means ineffective for portions of each scanning cycle so that the number of said bursts occurring during each scanning cycle is representative of the particular transmitting station to which said receiver is tuned.

4. In a system for producing for record purposes information relative to the particular radio transmitting stations to which a wave signal receiver is tuned, an oscillator, means including step switching means for causing said oscillator to produce an output having a plurality of discrete frequencies each of which is related to the transmitting frequency of a different one of said radio transmitting stations, each discrete frequency differing from its related transmitting frequency by a predetermined frequency, means for heterodyning a signal obtained from the local oscillator of said wave signal receiver with the output of said oscillator, means for operating said means including said step switching means to cause an output of said discrete frequencies to be produced successively during each cycle of operation and in constantly recurring cycles, whereby a beat frequency signal of a frequency equal to said predetermined frequency is periodically produced at the instant during each cycle when the output of said oscillator is of the frequency which differs from the frequency of the signal being received by said wave signal receiver by said predetermined frequency, a second oscillator for producing an output of a predetermined frequency, means for periodically interrupting the plate circuit of said oscillator so as to cause it to produce periodic pulses of energy uniformly spaced with reference to time which spacing corresponds to the spacing between the steps of said step switching means, and means responsive to the receipt of said beat frequency signal of said predetermined frequency during each cycle for rendering said second oscillator ineffective to produce said periodic pulses during the remainder of said cycle whereby the number of pulses produced during each cycle is representative of the particular transmitting station to which said wave signal receiver is tuned.

5. In a system for producing for record purposes information relative to the particular radio transmitting stations to which a wave signal receiver is tuned, an oscillator, means including step switching means for causing said oscillator to produce an output having a plurality of discrete frequencies each of which is related to the transmitting frequency of a different one of said radio transmitting stations, each discrete frequency differing from its related transmitting frequency by a predetermined frequency, means for heterodyning a signal obtained from the local oscillator of said wave signal receiver with the output of said oscillator, means for operating said means including said step switching means to cause said discrete frequencies to be produced successively during each cycle of operation and in constantly recurring cycles, whereby a beat frequency signal of a frequency equal to said predetermined frequency is periodically produced at the instant during each cycle when the output of said oscillator is of the frequency which differs from the frequency of the signal being received by said wave signal receiver by said predetermined frequency, means for producing periodic pulses of energy uniformly spaced with reference to time which spacing corresponds to the spacing between the steps of said step switching means, and means responsive to the receipt of said beat frequency signal of said predetermined frequency during each cycle for preventing said last mentioned means from producing said periodic pulses during the remainder of said cycle whereby the number of pulses produced during each cycle is representative of the particular transmitting station to which said wave signal receiver is tuned.

6. Apparatus for producing information relative to the particular transmitting station to which a wave signal receiver is tuned, comprising, means for continually scanning the frequency spectrum by producing a signal varying in frequency in a series of discrete steps during each scanning cycle each frequency step being representative of a particular transmitting station capable of being tuned in by said receiver, means responsive to the production of the predetermined one of said frequency steps representative of the transmitting station to which said receiver is tuned for producing a predetermined electrical impulse during each scanning cycle the position of which in said cycle is representative of a particular transmitting station tuned in by said receiver, a control device operative in a predetermined manner during each cycle, means for changing the operation of said control device in response to the receipt of said predetermined electrical impulse, and automatic means operative at the end of each cycle for restoring said control device to its initial operating condition.

7. Apparatus for producing information relative to the particular transmitting station to which a wave signal receiver is tuned, comprising, means for scanning the frequency spectrum by producing a signal varying in frequency in a series of discrete steps during each scanning cycle each frequency step being representative of a particular transmitting station capable of being tuned in by said receiver, means responsive to the production of the predetermined one of said frequency steps representative of the transmitting station to which said receiver is tuned for producing a predetermined electrical impulse during each scanning cycle the position of which in said cycle is representative of a particular transmitting station tuned in by said receiver, a control device operative in a predetermined manner during each cycle, means for rendering ineffective the operation of said control device in response to the receipt of said predetermined electrical impulse, and automatic means operative at the end of each cycle for restoring said control device to its initial operating condition.

8. In a system for producing for record purposes information relative to the particular radio transmitting stations to which a wave signal receiver is tuned, an oscillator, means including step switching means for causing said oscillator to produce an output having a plurality of discrete frequencies each of which is related to the transmitting frequency of a different one of said radio transmitting stations, each discrete frequency differing from its related transmitting frequency by a predetermined frequency, means for heterodyning a signal obtained from the local oscillator of said wave signal receiver with the output of said oscillator, means for operating said means including said step switching means to cause an output of said discrete frequencies to be produced successively during each cycle of operation and in constantly recurring cycles, whereby a beat frequency signal of a frequency equal to said predetermined frequency is periodically produced at the instant during each cycle when the output of said oscillator is of the frequency which differs from the frequency of the signal being received by said wave signal receiver by said predetermined frequency, a second oscillator for producing an output of a predetermined frequency which frequency is uniquely representative of said wave signal receiver, a rotary switch rotatable with said step switching means for periodically interrupting the output circuit of said second oscillator so as to cause it to produce periodic pulses of energy uniformly spaced with reference to time which spacing corresponds to the spacing between the steps of said step switching means, means responsive to the receipt of said beat frequency signal of said predetermined frequency during each cycle for biasing said second oscillator so that it is ineffective to produce said periodic pulses during the remainder of said cycle whereby the number of pulses produced during each cycle is representative of the particular transmitting station to which said wave signal receiver is tuned, and means for producing a record of the output of said second oscillator.

SERGE A. SCHERBATSKOY.

References Cited in the file of this patent

UNITED STATES PATENTS

| Number | Name | Date |
|---|---|---|
| 2,249,324 | Potter | July 15, 1941 |
| 2,275,460 | Page | Mar. 10, 1942 |
| 2,344,562 | Potter | Mar. 21, 1944 |
| 2,418,139 | Preisman | Apr. 1, 1947 |
| 2,418,750 | Bliss et al. | Apr. 8, 1947 |